INVENTORS
TERENCE C. KELLY
CHARLES S. THOMPSON
BY
*Meyer, Tilberry & Body*
ATTORNEYS.

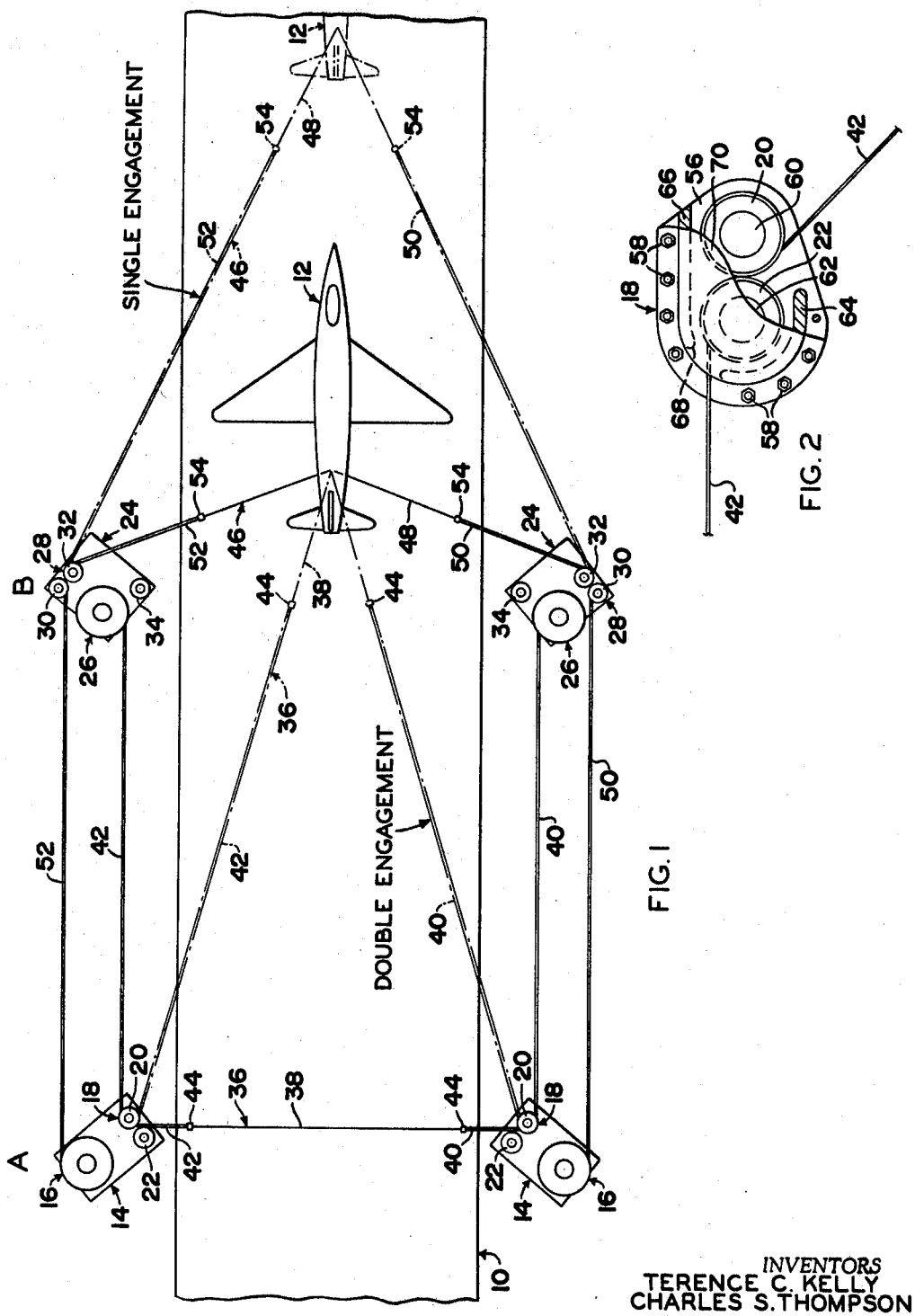

United States Patent Office

3,502,289
Patented Mar. 24, 1970

3,502,289
ARRESTING SYSTEM
Terence C. Kelly, Collingdale, Pa., and Charles S. Thompson, Vincentown, N.J., assignors to E. W. Bliss Company, Stark County, Ohio, a corporation of Delaware
Filed Apr. 24, 1968, Ser. No. 723,766
Int. Cl. B64f 1/02
U.S. Cl. 244—110          9 Claims

ABSTRACT OF THE DISCLOSURE

There is provided an improvement in aircraft arresting systems of the type adapted to be mounted adjacent a runway and having pendant means extending across the runway to receive landing aircraft, and for arresting the forward progress of the aircraft. The improvement includes a pair of interconnected arresting systems, in which pairs of arresting gear engines are anchored on opposite sides and adjacent the runway, and wherein pendant means extend across the runway between the anchorages of each pair. Each pendant means is controlled by the arrestment engines that are mounted in the other pair of anchorages. Deck sheaves, mounted with the arresting gear engines, direct the pendant means to the appropriate engines. The system is made to be bi-directional to accept aircraft approaching from either direction.

---

The present invention pertains to the art of arresting systems for operational aircraft, and more particularly to a type of arresting system wherein a pendant extends across a runway for engagement and arrestment of a landing aircraft.

The present invention is particularly applicable to aircraft arresting systems mounted adjacent an aircraft runway, and will be described with particular reference thereto; however, it is to be appreciated that the invention has application to other locations, such as the deck of an aircraft carrier, and is also applicable to operation with missiles or other flying objects where landing is to be accomplished within a limited space.

The general scheme for arresting the forward speed of an aircraft making a landing on an airstrip, the deck of an aircraft carrier or the like, is to provide a pendant which is disposed transversely across the path of the aircraft to be intercepted by a hook mounted on the aircraft, or by some other portion of the aircraft itself. The opposite ends of the pendant are secured to arrestment engines which will permit the pendant to yield with the aircraft and, at the same time, provide predetermined resistance to the forward motion of the aircraft of a magnitude sufficient to bring the aircraft to a stop in a safe and gradual manner and within a predetermined distance. The arrestment engines are anchored to the ground, or other fixed structure, on opposite sides of the airstrip or runway, the location of the engines relative to the runway being important for proper operation thereof and proper stopping of the aicraft. In some arrestment systems, a second independent engine and pendant arrangement is provided at a spaced location from the first engine and pendant assembly, to receive aircraft that miss the first assembly, commonly called "bolters," the second system being a repeat of the first system in all respects.

The installation and location of arresting gear to properly accept the dynamic loading of high speed arrestments has proven to be a problem in the past. When the engines are anchored too close to the runway the inertia of the arrestment engine and its pendant reel is too much for the rapid accelerations as the pendant is engaged by the aircraft. To solve this problem, it has been the practice in the past to mount the engines farther away from the runway or airstrip, thus increasing the span of the pendant therebetween. It is readily apparent that this creates problems in aircraft carrier installations where space adjacent the runway is limited. With respect to ground installations, the ground is not always level, and the sweep required by the system is detrimental to runway operation. Runway lights, markers and other objects interfere with the pendant as it moves down the runway with the landing aircraft. When inclement weather conditions are encountered, such as snow and rain, servicing and maintenance problems are intensified with the increased span. A second solution to the problem has been to mount the arresting engines closely adjacent the runway, but utilizing deck sheaves adjacent the runway and well behind the arresting engines so that the pendant means double back upon themselves, thus providing the proper inertia for operation of the system. Although this introduces sufficient damping into the system, so that the peak loads are rounded off by the construction of the pendant means, the system requires extra anchoring and extra equipment which is expensive to mount and to maintain. Accordingly, there has been an ever-present demand for an arrestment system permitting optimum location of the arresting engines and pendant reels adjacent the airstrip, which will permit operation of the system without interference from runway associated equipment, which can be easily serviced and maintained and which will avoid the problems heretofore associated with arrestment systems.

The present invention is directed toward an operational aircraft arresting system that may be mounted closely adjacent the airstrip or runway on which the aircraft is to land, which maintains the span of the pendant means at a reasonable length and yet creates the proper operational parameters in the system for optimum arrestment of an aircraft.

In accordance with the present invention, there is provided an arrestment system mountable adjacent the airstrip or runway and comprising interconnected sub-systems having pendant means extending across the runway at spaced locations for engagement by a landing aircraft, and wherein the pendant means, as they are extended with the moving aircraft, do not interfere with runway associated equipment.

In accordance with another aspect of the present invention, there is provided an arrestment system including pairs of arrestment engines and pendant reels spaced longitudinally along the airstrip or runway, and pendant means extending between each of the reels in each pair of arrestment reels, and inter-cooperating operation of each pendant means by the arresting engines and reels of the opposite pair.

In accordance with a further aspect of the present invention, there is provided an arrestment system wherein spaced pairs of arrestment engines and pendant reels are located closely adjacent an airstrip or runway on base frames securely anchored to the ground, and wherein sheave means are provided on the base frame structures to direct pendant means extending between one pair of base frames to the engine reels on the other pair of base frames for operation thereof.

The primary object of the present invention is the provision of an arresting ssytem for operational aircraft comprising spaced pendant means extending across an airstrip or runway and adapted to be engaged by a landing aircraft, and spaced pairs of arresting engines and pendant reels, each pair being engaged by pendant means and the system being interconnected for mounting closely adjacent the airstrip or runway.

Another object of the present inventiion is the provision of such an arresting gear system utilizing sheave means to direct the pendant means from the anchoring assembly at one pair of arresting engines and reels to the other pair of arresting engines and reels.

Still another object of the present invention is the provision of such an arrestment system utilizing other sheave means so that the system is bi-directional to receive aircraft landing in either direction on the air strip or runway.

These and other objects and advantages will become apparent from the following description, used to illustrate a preferred embodiment of the present invention as read in connection with the accompanying drawings in which:

FIGURE 1 is a schematic view of a portion of an aircraft runway, illustrating the location and mounting of the arrestment system for engagement by an aircraft landing in one direction;

FIGURE 2 is an enlarged view of a portion of the arresting gear system illustrated in FIGURE 1.

Figure 3:
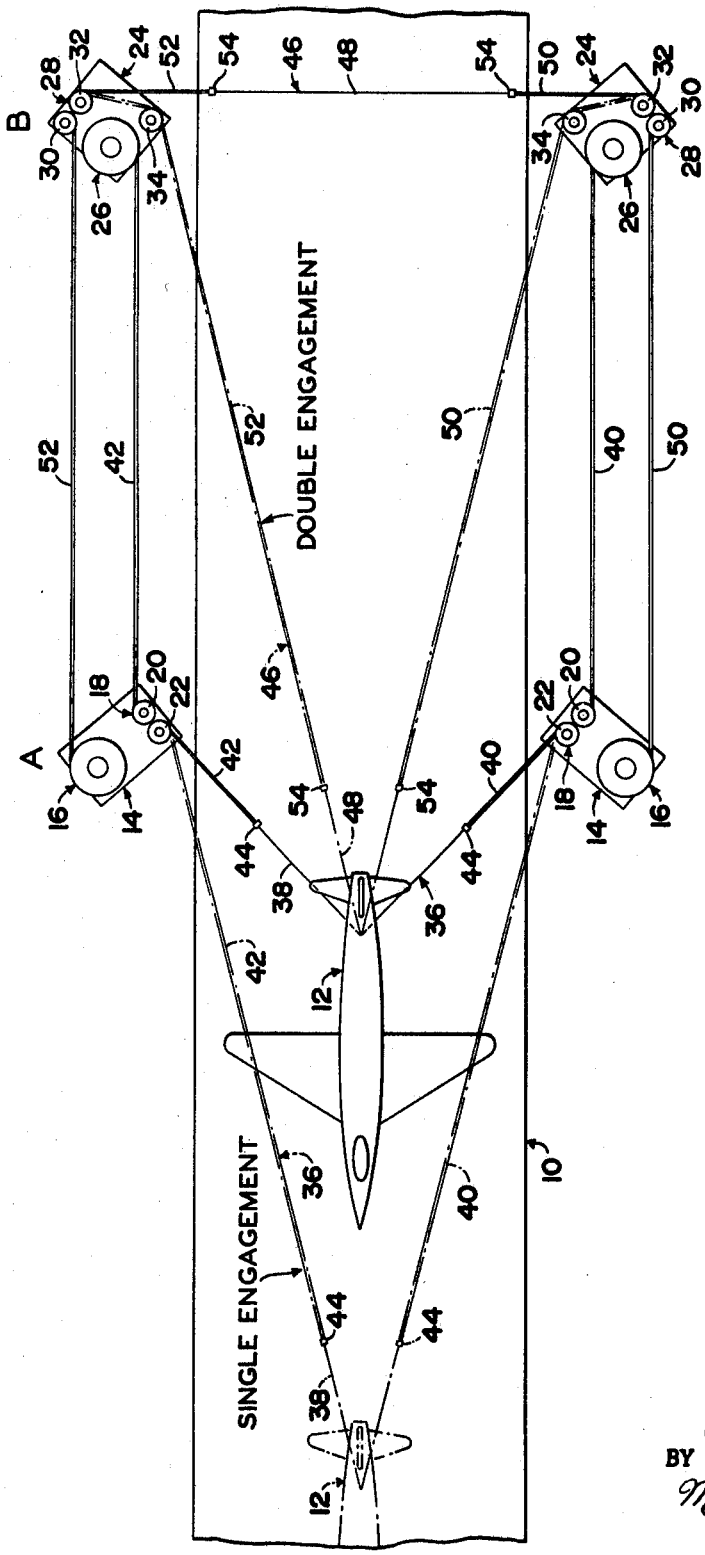
FIGURE 3 is a view similar to FIGURE 1 showing the arrestment system in operation for an aircraft landing in the opposite direction.

Referring now to the drawings, wherein the showings are for the purpose of illustrating a preferred embodiment of the invention only and not for the purpose of limiting same, FIGURE 1 shows an aircraft runway, indicated generally by the numeral 10, on which an aircraft, indicated generally by the numeral 12, is adapted to land. Adjacent the runway 10 is an arrestment system, which will be hereinafter more particularly described, adapted to be engaged by the aircraft 12. As is well known in the art, aircraft 12 is provided with a suitable hook, or other superstructure, extending from the under surface thereof for the purpose of engaging the arresting system and bringing the aircraft 12 to a stop in a relatively short predetermined distance without requiring the aircraft to completely run the length of the airstrip.

The arresting system illustrated in FIGURE 1 is shown to include spaced sub-systems, indicated generally by the letters A and B, the sub-systems being interconnected for cooperation in receiving the aircraft 12. Sub-system A includes base frames, indicated generally by the numeral 14, located closely adjacent the edges of the runway 10 and anchored to the ground in any suitable manner. Mounted on base frames 14 are arrestment engines of any suitable type known in the art and represented by reels, indicated generally by the numeral 16, rotatably mounted on the base frames 14. Also mounted on base frames 14, and spaced from the reels 16, are sheave assemblies, indicated generally by the numeral 18, and which include sheaves 20 and 22 rotatably mounted on the base frames 14 and closely adjacent each other. The specific construction of the sheave assemblies 18 will be hereinafter more particularly described.

Sub-system B includes base frames, indicated generally by the numeral 24, anchored to the ground and closely adjacent the edges of the runway 10, and spaced longitudinally along the runway 10 from the base frames 14 in sub-system A. Mounted on base frames 24 are arrestment engines, represented by reels indicated generally by the numeral 26, such reels being rotatably mounted on the base frames 24 which are in turn suitably anchored in the ground. Sheave assemblies, indicated generally by the numeral 28, are mounted on base frames 24 and include sheaves 30 and 32 rotatably secured on the base frames 24. The particular construction of sheave assemblies 28 will become hereinafter more apparent. Also rotatably mounted on base frames 24 are secondary sheaves 34, the purpose for which will become hereinafter more apparent.

Extending between the base frames 14 of the sub-system A is a pendant structure, indicated generally by the numeral 36, which includes a wire cable 38 extending substantially across the runway 10 and engageable with the aircraft hook or other aircraft structure. At opposite ends of the cable 38 are tapes 40 and 42, of the type well known in the art, which are entrained around the sheave assemblies 18 and extend along the runway to the arrestment engine reels 26 located on the base frames 24. Suitable connector means 44 are provided to secure the ends of the tapes 40 and 42 to the cable 38.

Similarly, extending between the base frames 24 of the sub-system B is a pendant assembly, indicated generally by the numeral 46, which includes a cable 48 extending substantially across the runway 10 and having secured to the ends thereof tapes 50 and 52. Tapes 50 and 52 are entrained around the sheave assemblies 28 and extend along the runway to the arrestment engine reels 16 mounted on the base frames 14. Suitable connector means 54 connect the ends of the tapes 50 and 52 to the respective ends of the cable 48.

With reference now to FIGURE 2, the construction of the sheave assemblies 18 is illustrated. It should be understood that the sheave assemblies 28 may be constructed in the same manner as sheave assemblies 18 for common manufacture. Sheave assemblies 18 include a base plate 56 that is rigidly secured to the base frame 14 by means of a plurality of nut and bolt assemblies 58. Mounted in the base plate 56 are the sheaves 20 and 22, rotatable around shafts 60 and 62 respectively. Extending upwardly from base plate 56 are flanges 64 and 66, located to have an opening 68 therebetween, for directing the tapes, such as tape 42, from the assembly. A housing or cover 70 is mounted over the base plate 56 and the sheaves 20 and 22 for protection against the weather.

Referring again to FIGURE 1, the operation of the arresting gear system will now be described. Assuming an aircraft 12 is approaching the runway 10 from the left-hand direction, as viewed in FIGURE 1, the pendant means 36 and 46 will be extending transversely across the runway and spaced a suitable distance above the surface thereof. As the aircraft engages the runway, and the hook or other portion thereof engages the pendant cable 38, the reels 26 will begin their operation in the usual manner to slow the aircraft. The tapes 40 and 42 will be payed out of the reels 26 at the proper speed and with the proper resistance, and the cable 38 will be carried down the runway along with the aircraft 12. At such time as the aircraft reaches pendant means 46, the aircraft hook or other structure will engage the cable portion 48 and the reels 16 will begin their proper operation to assist in slowing the aircraft. Tapes 50 and 52 will be payed out of the reels 16 at the proper speed and with the proper resistance so that the double engagement of the aircraft by the pendant means 36 and 46 will slow the aircraft within the predetermined distance.

Should the aircraft 12 miss the pendant means 36, for some reason, the pendant means 46 is so located relative to the pendant means 36 that the cable 48 will be engaged and operate through the arrestment engine reels 16 sufficiently to halt the aircraft.

It will be apparent that in such operation the pendant means 36, operating through the reels 26 on the base frames 24, are entrained around the sheaves 20 and pulled thereagainst as the aircraft moves down the runway. Similarly, the pendant means 46 are entrained around the sheaves 32 and pull thereagainst and against the reels 16 as the aircraft proceeds in its landing cycle.

With reference now to FIGURE 3, it may be seen that the operation is similar with respect to an aircraft landing on the runway 10 from a direction to the right, as viewed in FIGURE 3, and proceeding toward the left. At such time as the aircraft 12 engages the pendant means 46, the arrestment reels 16 will begin to operate, and as the aircraft 12 continues down the runway, the aircraft substructure will engage the pendant means 36 and begin operation of the arrestment reels 26. It will be noted that under such conditions of double engagement the tapes 50 and 52 engage the secondary sheaves 34 mounted on base frame 24, thus preventing interference between the tapes 50 and 52 with the arrestment reels 26 on base frames 24. Tapes 50 and 52 are entrained around sheaves 32 to extend toward the arrestment reels 16. The tapes 40 and 42 on pendant means 36 engage both sheaves 20 and 22, as illustrated in FIGURE 3, and are then directed to arrestment reels 26 for operation thereby. Once again, should the pendant means 46 be missed by the aircraft 12, the pendant means 36 are available for engagement and halting of the aircraft.

It will be apparent that the location of the base frames 14 and 24 may be extremely close to the edges of the runway 10, so that the pendant means 36 and 46 will not interfere with runway associated equipment as the tapes are payed out with the landing of the aircraft. At the same time, the design parameters for optimum operation are met, since the pendant means and arresting engines are disposed in inter-connecting manner in the separate sub-systems.

Having thus described our invention, we claim:

1. An arresting system for operational aircraft mounted adjacent a runway and comprising: first and second pairs of base frames anchored adjacent said runway and on opposite sides thereof, said second pair of base frames being spaced along said runway from said first pair of base frames; first pendant means adapted to engage an aircraft approaching from one direction, said pendant means extending across said runway between said first pair of base frames; first arrestment means mounted on each of said second pair of base frames, said first arrestment means being operatively connected to said first pendant means; second pendant means adapted to engage an aircraft approaching from said one direction and extending across said runway between said second pair of base frames; second arrestment means mounted on each of said first pair of base frames, said second arrestment means being operatively connected to said second pendant means; and means on each of said base frames for directing said pendant means to the respective arrestment means.

2. The arresting system set forth in claim 1 and further including other means on each of said base frames for directing said pendant means to the respective arrestment means when said aircraft approaches and engages said pendant means from another direction.

3. An arresting system for operational aircraft mounted adjacent a runway and comprising: first and second pairs of base frames anchored adjacent said runway and on opposite sides thereof, said second pair of base frames being spaced along said runway from said first pair of base frames; arrestment engine reels mounted on each of said base frames; first and second pendant means extending across said runway and between said first and second pairs of base frames respectively, either or both of said pendant means being adapted to be engaged by said aircraft approaching said pendant means from one direction, said first pendant means being connected to said arrestment reels on said second pair of base frames and said second pendant means being connected to said arrestment reels on said first pair of base frames; and sheave members on each of said base frames to to direct said pendant means to said respective arrestment reels.

4. The arresting system set forth in claim 3 and further including second sheave members mounted on each of said base frames and engageable by said first and second pendant means when said aircraft engages either or both of said first and second pendant means from another direction.

5. An arresting system for operational aircraft mounted adjacent a runway and comprising: a first pair of base frames spaced on opposite sides of said runway and anchored to the ground; a first arresting engine reel mounted on each of said first base frames; a first sheave rotatably mounted on each of said first base frames; a second pair of base frames spaced on opposite sides of said runway and spaced longitudinally along said runway from said first pair of base frames, said second pair of base frames being anchored to the ground; a second arresting reel mounted on each of said second base frames; a first pendant extending substantially across said runway and between said first pair of base frames; a first pair of tapes secured to opposite ends of said first pendant and entrained around said first sheaves and extending to said second arresting engine reels; a second pendant extending substantially across said runway and between said second pair of base frames; a second pair of tapes secured to opposite ends of said second pendant and entrained around said second sheaves and extending to said first arresting engine reels; said first pendant being located to first engage an aircraft landing in one direction on said runway and said second pendant being located to engage said aircraft after engagement by said first pendant, and said second pendant being located to engage said aircraft when said aircraft misses said first pendant.

6. The arrestment system set forth in claim 5 and further including second sheaves mounted on said base frames and engageable by said tapes when said aircraft lands on said runway in the other direction and engages one or both of said pendants.

7. An arresting system mounted adjacent a runway for arresting operational aircraft and comprising: first and second pairs of arrestment engines mounted at longitudinally spaced points along said runway; a first pendant means extending transversely across said runway generally at the location of said second pair of arrestment engines; a second pendant means extending transversely across said runway generally at the location of said first pair of arrestment engines; and, means including sheave members for connecting said first pendant means to said first pair of arrestment engines and for connecting said second pendant means to said second pair of arrestment engines.

8. The arresting system as defined in claim 7 wherein said first and second pairs of arrestment engines are mounted on separate base frames.

9. The arresting system as defined in claim 8 wherein separate ones of said sheave members are mounted on each of said base frames.

References Cited

UNITED STATES PATENTS 2,731,219  1/1956  Cotton et al. _____ 244—110
3,139,249  6/1964  Trifillis _____ 244—110

MILTON BUCHLER, Primary Examiner

P. E. SAUBERER, Assistant Examiner